United States Patent [19]

Sharygin et al.

[11] Patent Number: 5,190,907
[45] Date of Patent: Mar. 2, 1993

[54] GRANULATED INORGANIC SORBENT AND METHOD OF ITS MANUFACTURE

[76] Inventors: Leonid M. Sharygin, Beloyarsky raion, pos.Zarechny, ul.Aleschenkova, d.5, kv.20; Vladimir I. Barybin, Beloyarsky raion, pos. Zarechny, ul.Lenina, d. 36, kv.36; Valery F. Gonchar, Beloyarsky raion, pos.Zarechny ul.Takhovskaya, d.22, kv.44; Olga J. Smyshlyaeva, Beloyarsky raion, pos.Zarechny, ul.Kurchatova, d.2a, kv.9; Anatoly P. Shtin, Beloyarsky raion, pos.Zarechny, ul.Aleschenkova, d.5. kv.24; Sergei Y. Tretyakov, Beloyarsky raion, pos.Zarechny, ul.Aleschenkova, d.7b, kv.87; Valery E. Moiseev, Beloyarsky raion, pos.Zarechny ul.Takhovskaya, d.24, kv.71; Tatyana N. Perekhozhiva, Beloyarsky raion, pos.Zarechny ul. Aleschenkova, d.5, kv. 31; Vladimir M. Galkin, Beloyarsky raion, pos.Zarechny ul. Aleschenkova, d.7b, kv.69; Alma V. Korenkova, Beloyarsky raion, pos.Zarechny ul. Loningradskaya, d.16, kv.9; Elena I. Zlokazova, Beloyarsky raion, pos.Zarechny ul.Takhovskaya, d.18, kv.39; Sergei M. Vovk, Beloyarsky raion, pos.Zarechny ul.Klary Tsetkin, d.11, kv.27; Valery G. Ponomarev, Beloyarsky raion, pos.Zarechny ul.Leningradskaya, d.16, kv.140, all of Sverdlovskaya obl., U.S.S.R., 624051

[21] Appl. No.: 676,705

[22] Filed: Mar. 29, 1991

[30] Foreign Application Priority Data

May 29, 1989 [SU] U.S.S.R. ............................ 4691307

[51] Int. Cl.$^5$ .................... B01J 20/06; C01G 19/02; B01D 53/02
[52] U.S. Cl. ........................... 502/400; 204/96; 210/683; 423/213.2; 423/213.5; 423/593; 423/598; 502/5; 502/405
[58] Field of Search .................... 502/5, 8–10, 502/400, 405, 349, 350, 352; 204/96; 423/593, 598

[56] References Cited

U.S. PATENT DOCUMENTS 4,268,422  5/1981  Becker et al. .................... 502/400

FOREIGN PATENT DOCUMENTS 715643  2/1980  U.S.S.R. .................... 204/96

Primary Examiner—Paul E. Konopka
Attorney, Agent, or Firm—Beveridge, DeGrandi, Weilacher & Young

[57] ABSTRACT

A granulated inorganic sorbent having the formula:

$$Ti_xZr_ySn_{1-x-y}O_2 \cdot nH_2O$$

where $0 < x+y < 1$, $x = 0–0.95$, $y = 0–0.15$, $n = 0.05–1.8$, has a specific surface of 30–250 m$^2$/g and represents a solid solution with a rutile type structure characterized by principal peaks at the angle $2\theta$ equal to $26.8 \pm 0.7$, $34.5 \pm 1.5$, $52.8 \pm 1.5$ degrees.

The method of its manufacture comprises electrolysis of an aqueous solution containing tin chloride, titanium chloride and/or zirconium chloride at a molar ratio Ti:Zr:Sn = (0–0.95):(0.0.15):(0.03–1.0), followed by dropwise dispersion of the formed sol in a gelling liquid at pH $\geq$ 12 and heat treatment of the gel particles at a temperature within 20° to 900° C.

17 Claims, No Drawings

GRANULATED INORGANIC SORBENT AND METHOD OF ITS MANUFACTURE

TECHNICAL FIELD

The present invention relates to inorganic materials intended for use in high-temperature technological processes and, more particularly, to a granulated inorganic sorbent and method of its manufacture.

PRIOR ART

All granulated sorbents are characterized, depending on their purpose, by the following performance properties: mechanical strength of the grain (granule), thermal stability, chemical and radiation stability, specific surface and sorption capacity.

Carrying out of various technological processes in gas and liquid streams at elevated temperatures and pressures, and under aggressive media conditions (for instance, heterogeneous catalysis, adsorption and separation of gases, purification of uncooled aqueous condesates and heat-transfer, media at nuclear power plants) stipulates the use of granulated inorganic sorbents possessing a developed active surface, featuring a high chemical and thermal stability, in specific cases also an adequate radiation stability, and good strength characteristics under different service conditions thereof.

Known in technological practice of processing gas and liquid streams are sorbents based on activated carbon. For example, this sorbent is used directly in a flow of argon at a temperature of 150°–180° C. for separating kripton and xenon; if modified with a solution of Al-CuCl$_4$ it is used for recovering carbon monoxide at a temperature of 100° C., and if modified with oxine or its derivatives, for purification of heat-transfer media of a nuclear reactor at temperatures up to 150° C. (EP, B, 0061924). The range of application of sorbents of this type is limited, in gas streams, by their thermal stability which does not exceed 300°–350° C. in air and, in high-temperature aqueous streams, by moderate chemical and mechanical stability of the base resulting in contamination of the stream with products of destruction. Besides, these sorbents are characterized by low radiation stability when used in an environment with a high level of ionizing radiation.

Also known in the art are inorganic sorbents based on oxides of multivalent metals possessing high thermal and radiation stability, a large specific surface and high adsorption capacity. Essentially, these are the sorbents based on aluminum oxide, silicon dioxide, and also titanium dioxide which additionally contains oxides of aluminum, iron, silicon, anions of inorganic acids (sulfuric, hydrochloric, phosphoric), and also sodium titanate with a composition of NaTiO$_5$H. These sorbents are used predominantly for the purification of high-temperature water streams from ions of metals contained in corrosion products, and from radiactive isotopes.

The above-mentioned oxide sorbents are characterized by low chemical stability in aqueous streams at high pressures and temperatures with the result that deleterious technological impurities (aluminum, silicon, chlorine, phosphorus, sulfur, sodium) are eluated out of sorbent into the liquid phase, this reducing the efficiency of the technological process. In particular, in the production of pure substances or water, this results in deterioration of final product quality, and in nuclear power engineering, in the purification of uncooled aqueous heat-transfer medium, this accelerates corrosion of lines, formation of deposits on reactor fuel elements and increase of radiation background.

For service in high-temperature aqueous streams, it was proposed to use thermostable hydrated oxides of metals belonging to the IV group of Periodic System possessing high chemical and radiation stability: TiO$_2$ (U.S. Pat. No. 4,268,422); TiO$_2$, ZrO$_2$, SnO$_2$ (JP, A, 56-13694); TiO$_2$, SnO$_2$ (JP, A, 58-51640), and also titanium dioxide deposited on titanium sponge (U.S. Pat. No. 4,587,232).

These sorbents have a low hydrothermal stability in water at a temperature above 100° C. This is associated with the fact that, under hydrothermal conditions, crystallization processes and phase transformations proceed intensively in said sorbents, this causing fracture of the granules and entrainment of the sorbent by the filtrate.

Amorphous hydtated oxides of titanium, zirconium and tin, when subjected to heat treatment in air, undergo the following phase transformations:

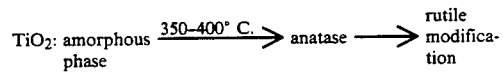

(Izvestia Akademii nauk SSSR. Moscow: Neorganicheskie Materialy, 1983, Vol. 19, No. 7/Malykh T. G. et al. "Vliyanie temperatury gidrotermalnoi obrabotki na poristuyu strukturu i mekhanicheskuyu prochnost sorbenta na osnove granulirovannogo dioxida tatana", pp.1215–1217);

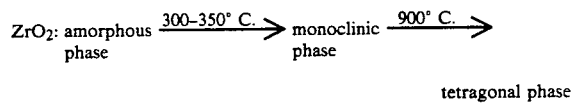

(Kolloidny Zhurnal, Moscow, 1983, Vol. 45, Issue 3/ Sharygin L. M. et al. "Gidrotermalnaya ustoichivost gidratirovannoi dvuokisi tsirkonia", pp.608–611);

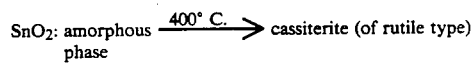

(Journal "Kinetika i Kataliz", 1975, Vol. 16, No. 6/ Sharygin L. M. et al. "Gidrotermalnoe modifitsirovanie poristoi struktury gidratirovannoi dvuokisi olova", pp.1056–1061. —Hydrothermal modification of the porous of hydrated stannic oxide).

As has been established, under hydrothermal conditions at a temperature of water of 150°–350° C. the specific surface and the mechanical strength of the granules of amorphous oxides of zirconium, titanium and tin sharply drops as a result of chemical and phase transformations of the sorbent, the phase transformation of the initial amorphous matrix starting at a much lower temperature than in the case of heat treatment in air. For example, in the process of hydrothermal heat treatment hydrated oxide of zirconium, amorphous according to X-ray diffraction analysis, starts to be transformed into the metastable tetragonal modification already at the temperature of water of 160° C., and at 350° C. the transition of the latter into stable monoclinic phase is practically completed in eight days. As a result, in such transformation internal stresses arise in the primary particles of hydrated oxides of titanium, zirconium, and tin which leads to their deaggregation and, as a consequence, to mechanical destruction of the sorbent granules in the process of filtration and to pollution of the high-temperature aqueous stream with the products of destruction thereof.

Known in the art is an inorganic granulated sorbent on the basis of oxides and partly hydrated oxides of metals, having a composition (U.S. Pat. No. 4,661,282)

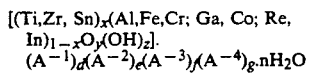

where
  A is an anion with negative valence 1, 2, 3, 4, respectively;
  $y \geq z$
  $0 < x < 0.5$
  $0 < d + 2e + 3f + 4g \leq x$
  $0 \leq n \leq 10$.

The sorbent is produced by co-precipitating salts of two metals in an aqueous medium at constant pH, this being followed by drying the resultant gel at a temperature lower than 150° C., treating it with an acid ($H_3PO_4$, $H_2SO_4$) and roasting thereof at a temperature of 160°–800° C. With such a method of producing the sorbent, the latter, even after drying at the temperature of 125° C., has a structure amorphous in terms of the X-ray diffraction analysis, comprising a mixed chemical composition of the hydroxides of two metals, of which one is titanium, zirconium or tin, an anionic acid residue, and water.

The sorbent has thermal and chemical stability at elevated temperatures (above 160° C.) and a considerable anion-exchanging capacity.

This sorbent, however, is characterized by insufficient chemical stability because of the presence in its composition of anions and metals with positive valence equal to three or five.

If the sorbent is used in the system of purification of non-cooled heat carrier of atomic electric power stations, the anions and said cations will be washed out of the sorbent, contaminating the filtrate with undersirable admixtures. The sorbent is noted for a low stability of its strength and structural-sorption characteristics, the cause thereof being in the crystallization processes and phase transistions occurring in the water at elevated temperatures. Such sorbent has short service life and is not reliable in operation.

DISCLOSURE OF THE INVENTION

It is an object of the present invention to provide a granulated inorganic sorbent with an ordered crystalline structure on the basis of oxides of metals belonging to group IV of the Periodic System, with improved strength and structural-sorption characteristics at elevated temperatures and pressures, characterized by stability in prolonged service under said conditions, and also to provide a method of producing said sorbent by employing electrochemical technology ensuring a prescribed crystalline structure and the desired combination of physico-chemical properties.

Said object is accomplished by that proposed herein is a granulated inorganic sorbent on the basis of oxides of metals belonging to group IV of the Periodic System which, according to the invention, has the formula:

$$Ti_xZr_ySn_{1-x-y}O_2 \cdot nH_2O$$

where
  $0 < x + y < 1$;
  $x = 0 - 0.95$;
  $y = 0 - 0.15$;
  $n = 0.05 - 1.8$, having a specific surface of 30–250 m²/g and representing a solid solution with a rutile type structure, and with X-ray diffractogram, as measured using $Cu$-$K\alpha$-radiation, characterized by principal peaks at the angle $2\theta$ equal to $26.8 \pm 0.7$, $34.5 \pm 1.5$, $52.8 \pm 1.5$ degrees.

The sorbent produced in accordance with the method of the invention is characterized by a considerable increase of the chemical and thermal stability in liquid and gas streams at a temperature of 150°–900° C. and elevated pressure and, as a consequence, by an increase of its service life and also by a reliability in oparation. The sorbent us noted for a high sorption and catalytic activity due to the developed surface thereof.

An increase of the content of titanium dioxide to more than 95 mole % leads to the appearance of anatase modification, whereas the content of zirconium dioxide exceeding 15 mole % contributes to the formation of the monoclinic phase.

In both cases the hydrothermal stability of the sorbent in high-temperature aqueous streams drop down sharply.

The upper limit of water content in the formula (n=1.8) is conditioned by a reduction in the strength of the granules of the desired product; the lower limit (n=0.05) is conditioned by the lowering of the sorption activity of the sorbent because of the low concentration of hydroxyl groups on the surface thereof.

A necessary condition for maintaining the required composition of the sorbent is the presence of tin dioxide whose content is varied within 3–98 mole %, depending on the ratio of titanium and zirconium dioxides. Varying the content of these three components is dictated by the required properties of the sorbent, depending on the purpose and service conditions thereof.

Proposed herein is a sorbent which, according to the invention, has the following formula $$Ti_xZr_ySn_{1-x-y}O_2 \cdot nH_2O$$

where
  $x = 0.05 - 0.4$;
  $y = 0.02 - 0.15$;
  $n = 0.05 - 1.8$, possessing a structure with an X-ray diffractogram characterized by principal peaks at the angle $2\theta$ equal to $26.8 \pm 0.4$, $34 \pm 0.9$, $52.2 \pm 0.8$ degrees.

A sorbent of such composition possesses an increased adsorption and catalytic activity in high-temperature steam-gas and gaseous streams containing radioactive iodine and its organic derivatives, and can be used as well for neutralizing exhaust gases containing carbon monoxide, and in catalysis.

Proposed herein also is a sorbent which, according to the invention, has the following formula $$Ti_xZr_ySn_{1-x-y}O_2 \cdot nH_2O$$

where
  $x = 0.4 - 0.95$;
  $y = 0.02 - 0.15$;
  $n = 0.05 - 1.8$, possessing a structure with an X-ray diffractogram characterized by principal peaks at the angle $2\theta$ equal to 26.8±0.4, 35.2±0.9, 53.5±0.8 degrees. A sorbent of such composition has an increased sorption capacity with relation to uranium. It can be useful for decontamination of steam-gas emissions at nuclear plants and also for recovering uranium from solutions with complex combination of salts.

Proposed herein also is a sorbent which, according to the invention, has the following formula $$Ti_xSn_{1-x}O_2 \cdot nH_2O$$

where
x=0.05-0.9;
n=0.05-1.8,
possessing a structure with an X-ray diffractogram characterized by principal peaks at the angle $2\theta$ equal to 26.8±0.7, 34.5±1.5, 52.8±1.5 degrees.

Such a sorbent features an increased sorption capacity relative to ions of metals contained in corrosion products (iron, cobalt, nickel), or of toxic metals (lead, copper) and can be useful in a variety of technological processes which are conducted under common conditions or at elevated temperatures and pressures. The sorbent can be used in processing radioactive wastes and in cleaning steam-gas streams from organic derivatives of radioactive iodine.

Proposed herein also is a sorbent which, according to the invention, has the following formula $$Zr_ySn_{1-y}O_2 \cdot nH_2O$$

where
y=0.02-0.15;
n=0.05-1.8;
possessing a structure with an X-ray diffractogram characterized by principal peals at the angle $2\theta$ equal to 26.2±0.05, 33.1±0.05, 51.4±0.05 degrees. This sorbent features a high chemical resistance and strength. It can be used as an efficient collector for removing microcomponents, both in ion and colloid form, from high-temperature aqueous streams, for instance, uncooled heat transfer medium of a nuclear reactor, as well as from various process solutions. It can be used in various catalytic processes (both individually and as a carrier), in radiochemical industry, in processing high-radioactive waste and for decontamination of gas emissions containing radioactive iodine.

It is expedient that the surface of the sorbent should be modified by at least one element selected from one of groups I, II, III, V, VI, VII, VIII of the Periodic System, the amount of the said element being within 0.0005-1.5 mmole/g.

Modification extends the applicability of the said sorbent owing to increased adsorption and catalytic activity at high temperatures not only in gaseous and steam-gas streams, but also in organic and aqueous media.

In order to achieve good hydraulic and dynamic characteristics, it is advisable that the sorbent granules should have a shape close to spherical one, and possess fracture limit of at least 50 kgf/cm² and size within 0.001 to 3 mm.

The object is accomplished also by that proposed herein is a process for producing a granualted inorganic sorbent on the basis of oxides of metals belonging to group IV of the Periodic System in which, according to the invention, an aqueous solution containing tin chloride and at least one chloride of a metal selected from the group consisting of titanium and zirconium, at the molar ratio of Ti:Zr:Sn=(0-0.95):(0-0.15):(0.03-1.0), is subjected to electrolysis till the atomic ratio of chlorine to the metal becomes 0.2-1.0 ensuring the formation of a mixed sol of the hydrated oxides of metals, followed by dropwise dispersing of said sol in a gelating liquid with pH≧12, separating of the formed gel particles which are then washed and subjected to heat treatment at a temperature within 20° to 900° C. yielding granules of the desired product complying with the formula $$Ti_xZr_ySn_{1-x-y}O_2 \cdot nH_2O$$

where
0<x+y<1;
x=0-0.95;
y=0-0.15;
n=0.05-1.8,
having a specific surface of 30-250 m²/g and representing a solid solution of a rutile type structure, and with X-ray diffractogram, as measured using $Cu$-$K_\alpha$-radiation, characterized by principal peaks at the angle $2\theta$ equal to 26.8±0.7, 34.5±1.5, 52.8±1.5 degrees.

The method proposed herein, due to an appropriate selection of the parameters of the electrochemical process of producing a crystalline sol and the process of sol granulation in a gelating liquid, and also due to the combination of these stages in one technological cycle, ensures the formation of an ordered crystalline structure of a solid solution in the gel particles prior to the heat treatment stage, this being unattainable in any of the known methods of precipitation.

The method of the invention is adaptable to streamlined production and easy to realize, it makes possible the obviation of the long-time stages of precipitation, filtering of the gel, and comminution thereof. One technological operation (dispersing of the sol) enables the production of granules having the required fractional composition, washing off of the gel particles being carried out with a considerably smaller consumption of washing water.

Depending on the requirements to be met by the sorbent, it is recommendable that the aqueous solution subjected to electrolysis should contain: chlorides of titanium, zirconium and tin at the molar ratio thereof of (0.05-0.4):(0.02-1.15):(0.43-0.95), respectively, or chlorides of titanium, zirconium and tin at the molar ratio thereof of (0.4-0.95):(0.02-0.15):(0.03-0.45), respectively, or chlorides of titanium and tin at the molar ratio thereof of (0.05-0.9):(0.1-0.95), respectively, or chlorides of zirconium and tin at the molar ratio thereof of (0.02-0.15):(0.85-0.98), respectively.

The electrolysis of the latter solution is carried out till the atomic ratio of chlorine to the metal becomes 0.5-1.0.

In the course of the electrolysis hydrochloric acid is removed from the solution by way of decomposition of the hydrochloric acid at the electrodes into chlorine and hydrogen. As a result of the removal of the hydrochloric acid, the atomic ratio of Cl/Me, which in the initial solution of the chlorides reaches the value ~4, becomes diminished, there occur hydrolysis, polymerization, oxolation of the above said metals, and at Cl/Me≦1 there is formed an anion-deficient colloidal solution (sol) of hydrated oxides of metals with the structure of colloidal particles on the basis of the crystalline solid solution of the oxides of these metals. Lowering of the ration Cl/Me<0.2 involves technical difficulties because of a high liability of the synthesized sol to spontaneously gelate in the electrolytic cell. The resulting anion-deficient sol is dispersed dropwise into a gelating liquid, an aqueous solution of an alkali or of ammonia with pH$\geq$12 being preferably used as such liquid. At a lower pH value, the mechanical strength of the gel particles and granules of the desired product is reduced markedly. The gel particles are separated from the mother liquor, washed with water, and subjected to heat treatment at 20°-900° C. Such temperature conditions ensure the production of partially hydrated oxides of said metals. It is desirable that the solution to be subjected to electrolysis should have the total concentration of metal chlorides from 0.3 to 3 mole/liter. A concentration of the metal chlorides less than 0.3 mole/liter yields, at the stage of gelation, particles with small mechanical strength which become deformed or fractured in the process of further treatment, lowering the yield of the finished product. The production of a sol when the total concentration of the metal chlorides is greater than 3 mole/liter involves technological difficulties: the processes of hydrolysis go slowly, while membranes quickly become inoperative because of a high acidity of the electrolyte. The optimal range of temperatures for carrying out the electrolysis is 10°-80° C. The upper temperature limit is defined by the thermal stability of the cation-exchange and anion-exchange membranes which are destroyed at a temperature above 80° C. The lower temperature limit is conditioned by the low rate of hydrolysis of the metal chlorides, this restricting the efficiency of the electrolytic cell. The electrolysis is carried out at current densities not exceeding the limit values for the membranes of both types.

For extending the potential uses of the sorbent, according to the invention, after the heat treatment it is expedient that the surface thereof should be modified by treating with a $6\cdot 10^{-6}$–1.5 mole/liter solution of at least one salt of an element selected from groups I, II, III, V, VI, VII, VIII of the Periodic System or with at least one hydroxide of a metal selected from group I-II of the Periodic System, this being followed by heat treatment at a temperature of 100°-900° C.

The concentration of the solution is determined by the effect of modification, while the temperature and duration of the heat treatment depend on the nature of the modifier. The upper limit is determined by the loss of the sorption and catalytic properties of the modified sorbent; the lower limit of the heat treatment is determined by the necessity to remove physically bound ballast water from the sorbent before using thereof.

PREFERRED EMBODIMENT OF THE INVENTION

An aqueous solution comprising 0.231 mole/liter of tin chloride, 0.77 mole/liter of titanium chloride and 0.099 mole/liter of zirconium chloride (the molar ratio Sn:Ti:Zr=0.21:0.7:0.09) is fed to the middle chamber of a three-chamber electrolytic cell, separated from the cathode and anode spaces by corresponding ion-exchange membranes. In the electrolytic cell the cathode is made of titanium and the anode, of graphite. The electrolysis is carried out at the temperature of 40° C. and membrane current density of 400 A/m$^2$. The electrolysis is discontinued upon reaching the atomic ratio of chlorine to metal equal to 0.55.

The formed sol of hydrated oxides of tin, titanium, zirconium is dispersed dropwise through a glass capillary with an inner diameter of 0.2 mm into an aqueous solution of ammonia with pH 13. The resulting spherical gel particles are separated by filtration and washed with distilled water to remove the electrolyte.

The gel particles thus prepared, according to X-ray spectral analysis, have a structure of rutile type. Then, the particles are subjected to heat treatment at the temperature of 400° C. till spherical granules having a size of 0.2-0.4 mm are formed, with the fracture limit of 215 kg/cm$^2$. The yield of granulated sorbent is 96%. The sorbent has the formula $Ti_{0.7}Zr_{0.09}Sn_{0.21}O_2\cdot 0.27H_2O$, the specific surface thereof is 110 m$^2$/g, and the sorbent is a solid solution having a structure of rutile type, with an X-ray diffractogram measured with the help of $Cu$-$K\alpha$-radiation and characterized by main peaks at the angle 2$\theta$ of 27.0, 35.3 and 53.3 degrees. After 3000 hours of hydrothermal tests carried out in an autoclave at the temperature of 350° C. and pressure of water vapours saturated at this temperature, the sorbent has the following characteristics: specific surface, 48 m$^2$/g; fracture limit of the granules, 80 kgf/cm$^2$. Visual observations show complete absence of faulty or fractured granules in the whole lot subjected to the tests; this is a confirmation of good performance characteristics of the sorbent produced.

Other examples of producing a granulated inorganic sorbent, according to the invention, with indication of the physico-chemical and sorption characteristics thereof, are given hereinbelow.

EXAMPLE 1

An aqueous solution containing 0.3 mole/liter of TiCl$_4$, 0.08 mole/liter of ZrOCl$_2$ and 1.12 mole/liter of SnCl$_4$ with a total concentration of 1.5 mole/liter (the molar ratio Ti:Zr:Sn=0.20:0.05:0.75) is fed to the middle chamber of a three-chamber electrolytic cell, separated from the cathode space and from the anode space by corresponding ion-exchange membranes. A 0.1 mole/liter solution of hydrochloric acid is fed to the cathode and anode chambers of the electrolytic cell. The electrodes are made of materials resistant to hydrochloric acid and chlorine: the anode is made of graphite and the cathode is made of titanium. The electrolysis is carried out at the membrane current density of 300 A/m$^2$ and at the temperature of 35° C. The electrolysis yields a time-stable mixed sol with the atomic ratio Cl/Me=0.5.

The resulting mixed sol is dispergated dropwise into an aqueous solution of ammonia with pH 13.

The gel particles are washed off from the electrolyte with distilled water and divided into three lots. The first lot of the gel is thermostated at the temperature of 20° C. This gives granules having a shape close to the spherical one and a diameter of 0.1-0.5 mm. The second and third lots are subjected to heat treatment at the temperatures of 400° and 900° C., respectively. The resulting granulated sorbent has the formula

$Ti_{0.2}Zr_{0.05}Sn_{0.75}O_2\cdot nH_2O$ where n=1.8, 0.3, 0.05, respectively, at the heat treatment temperatures of 20°, 400° and 900° C.

Given hereinbelow, in Table 1, are Examples 2-15 of producing the sorbents of the formula

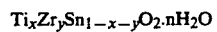

$Ti_xZr_ySn_{1-x-y}O_2\cdot nH_2O$ with indication of the parameters of their electrochemical synthesis, carried out as described in Example 1.

TABLE 1

| Example No. 1 | Initial aqueous solution | | | |
|---|---|---|---|---|
| | Total concentration of metal chloride, mole/liter 2 | Molar ratio of metal chlorides | | |
| | | Ti 3 | Zr 4 | Sn 5 |
| 2 | 1.5 | 0.05 | 0.02 | 0.93 |
| 3 | 1.5 | 0.20 | 0.15 | 0.65 |
| 4 | 1.5 | 0.40 | 0.05 | 0.55 |
| 5 | 1.5 | 0.40 | 0.15 | 0.45 |
| 6 | 1.5 | 0.40 | 0.01 | 0.59 |
| 7 | 1.1 | 0.35 | 0.15 | 0.50 |
| 8 | 1.1 | 0.40 | 0.15 | 0.45 |
| 9 | 1.1 | 0.50 | 0.09 | 0.41 |
| 10 | 1.1 | 0.70 | 0.09 | 0.21 |
| 11 | 0.3 | 0.70 | 0.09 | 0.21 |
| 12 | 3.0 | 0.70 | 0.09 | 0.21 |
| 13 | 1.1 | 0.70 | 0.09 | 0.21 |
| 14 | 1.1 | 0.87 | 0.10 | 0.03 |
| 15 | 1.1 | 0.95 | 0.02 | 0.03 |

| Example No. 1 | Temperature of electrolysis process, °C. 6 | Atomic ratio Cl/Me in sol 7 | XRCA data of sol (type of lattice) 8 |
|---|---|---|---|
| 2 | 15 | 0.8 | Rutile type |
| 3 | 35 | 0.4 | Item |
| 4 | 30 | 0.25 | Item |
| 5 | 30 | 0.2 | Item |
| 6 | 25 | 0.3 | Item |
| 7 | 40 | 0.55 | Item |
| 8 | 40 | 0.55 | Item |
| 9 | 40 | 0.55 | Item |
| 10 | 40 | 0.55 | Item |
| 11 | 80 | 0.20 | Item |
| 12 | 20 | 1.0 | Item |
| 13 | 10 | 0.55 | Item |
| 14 | 40 | 0.55 | Item |
| 15 | 40 | 0.55 | Item |

For studying the micro- and macrostructure of the sorbents, as well as the properties thereof, X-ray crystallographic analysis (XRCA) is used. X-ray crystallographic studies are carried out in a diffractometer with the use of $Cu\text{-}K\alpha$-radiation. The specific surface of the sorbents is calculated from the data on low-temperature adsorption of nitrogen by the BET method. The fracture limit is assessed by the method of crushing the granules between two rigid supports. An average value of the fracture limit is calculated as a result of testing 20 granules. The measuring error is 12–18%.

Hydrothermal treatment of the sorbents is carried out in stainless steel autoclaves under static conditions at the temperature of 350° C. and under a pressure equal to the pressure of saturated water vapours at the given temperature, 15 ml of a sample being placed into the autoclave. The hydrothermal stability is assessed by the time of hydrothermal treatment till fracture. In the course of the treatment samples of the sorbents are taken after definite periods of time for measuring the specific surface. The material is considered to be destroyed, if its specific surface is 30 m²/g. After 3000 hours of treatment the samples of the sorbents are discharged and the phase composition of the material, its strength and specific surface are determined again.

The sorption capacity of the sorbent for uranium ($a_u$) is determined in a solution imitating sea water with the initial pH value of 7.8 at room temperature. To this end, 200 mg of the sorbent dried at 125° C. are brought in contact under stirring with 20 ml of an imitation solution that contains uranium in the concentration of 1 mg/liter. In a week the sorbent is separated from the liquid phase, washed with distilled water from the mother liquor and analyzed for uranium with the help of neutron-activation analysis.

The compositions and properties of the granulated sorbents obtained as described in Examples 1–15, under different heat treatment conditions, are given in Table 2 hereinbelow.

TABLE 2

| Example No. 1 | Composition of sorbent 2 | n 3 | S, m²/g 4 | $\sigma_m$, kgf/cm² 5 | Properties of sorbent after heat treatment at 20° C. XRCA data: type of lattice, main peaks at the angle $2\Theta$, degree 6 |
|---|---|---|---|---|---|
| 1 | $Ti_{0.2}Zr_{0.05}Sn_{0.75}O_2 \cdot nH_2O$ | 1.8 | 230 | 190 | Rutile type 26.7; 34.3; 52.4 |
| 2 | $Ti_{0.05}Zr_{0.02}Sn_{0.93}O_2 \cdot nH_2O$ | 1.8 | 200 | 200 | Item, 26.4; 33.6; 51.8 |
| 3 | $Ti_{0.2}Zr_{0.15}Sn_{0.65}O_2 \cdot nH_2O$ | 1.8 | 240 | 190 | Item, 26.7; 34.3; 52.4 |
| 4 | $Ti_{0.4}Zr_{0.05}Sn_{0.55}O_2 \cdot nH_2O$ | 1.8 | 240 | 300 | Item, 27.0; 34.5; 52.7 |
| 5 | $Ti_{0.4}Zr_{0.15}Sn_{0.45}O_2 \cdot nH_2O$ | 1.8 | 246 | 260 | Item, 27.0; 34.5; 52.7 |
| 6 | $Ti_{0.4}Zr_{0.01}Sn_{0.59}O_2 \cdot nH_2O$ | 1.8 | 220 | 200 | Item, 27.0; 34.5; 52.8 |
| 7 | $Ti_{0.35}Zr_{0.15}Sn_{0.5}O_2 \cdot nH_2O$ | 1.8 | 250 | 110 | Item, 26.8; 34.3; 52.6 |
| 8 | $Ti_{0.40}Zr_{0.15}Sn_{0.45}O_2 \cdot nH_2O$ | 1.8 | 246 | 100 | Item, 27.0; 34.5; 52.7 |
| 9 | $Ti_{0.50}Zr_{0.09}Sn_{0.41}O_2 \cdot nH_2O$ | 1.8 | 245 | 105 | Item, 27.0; 34.7; 52.7 |
| 10 | $Ti_{0.70}Zr_{0.09}Sn_{0.21}O_2 \cdot nH_2O$ | 1.8 | 248 | 100 | Item, 27.0; 35.3; 53.3 |
| 11 | $Ti_{0.70}Zr_{0.09}Sn_{0.21}O_2 \cdot nH_2O$ | 1.8 | 240 | 100 | Item, 27.0; 35.3; 53.3 |
| 12 | $Ti_{0.70}Zr_{0.09}Sn_{0.21}O_2 \cdot nH_2O$ | 1.8 | 230 | 130 | Item, 27.0; 35.3; 53.3 |
| 13 | $Ti_{0.70}Zr_{0.09}Sn_{0.21}O_2 \cdot nH_2O$ | 1.8 | 250 | 100 | Item, 27.0; 35.3; 53.3 |
| 14 | $Ti_{0.87}Zr_{0.10}Sn_{0.03}O_2 \cdot nH_2O$ | 1.8 | 246 | 105 | Item, 27.0; 35.5; 53.6 |
| 15 | $Ti_{0.95}Zr_{0.02}Sn_{0.03}O_3 \cdot nH_2O$ | 1.8 | 250 | 190 | Item, 27.0; 35.8; 53.8 |

| Example No. 1 | Properties of sorbent after heat treatment at | | | |
|---|---|---|---|---|
| | 125° C. | | 400° C. | |
| | $a_u$ $\mu$mole/g 7 | n 8 | S, m²/g 9 | $\sigma_m$, kgf/cm² 10 |
| 1 | — | 0.27 | 90 | 400 |
| 2 | — | 0.27 | 80 | 450 |
| 3 | — | 0.26 | 96 | 380 |
| 4 | — | 0.25 | 110 | 660 |
| 5 | — | 0.26 | 105 | 600 |
| 6 | — | 0.26 | 80 | 320 |
| 7 | 5.0 | 0.26 | 102 | 210 |
| 8 | 5.7 | 0.26 | 105 | 200 |
| 9 | 7.0 | 0.25 | 108 | 205 |
| 10 | 9.7 | 0.27 | 112 | 210 |
| 11 | 9.8 | 0.26 | 103 | 160 |
| 12 | 9.7 | 0.25 | 108 | 250 |
| 13 | 9.6 | 0.28 | 110 | 215 |
| 14 | 12.2 | 0.26 | 115 | 170 |
| 15 | 13.3 | 0.27 | 117 | 150 |

| Example No. 1 | Properties of sorbent after heat treatment at 400° C. After hydrothermal treatment | | | |
|---|---|---|---|---|
| | Stability, hrs 11 | XRCA data: type of lattice, main peaks at the angle $2\Theta$, degree 12 | S, m²/g 13 | $\sigma_m$, kgf/cm² 14 |
| 1 | over 3000 | Rutile type | 50 | 100 |

TABLE 2-continued

| | | | | |
|---|---|---|---|---|
| | | 26.7; 34.3; 52.4 | | |
| 2 | over 1600 | Item | 26 | 70 |
| | | 26.4; 33.6; 51.8 | | |
| 3 | over 3000 | Item | 47 | 100 |
| | | 26.7; 34.3; 52.4 | | |
| 4 | over 3000 | Item | 52 | 110 |
| | | 27.0; 34.5; 52.7 | | |
| 5 | over 3000 | Item | 49 | 100 |
| | | 27.0; 34.5; 52.7 | | |
| 6 | over 3000 | Item | 46 | 100 |
| | | 27.0; 34.5; 52.8 | | |
| 7 | over 3000 | Item | 40 | 80 |
| | | 26.8; 34.3; 42.6 | | |
| 8 | over 3000 | Item | 42 | 80 |
| | | 26.8; 34.3; 52.6 | | |
| 9 | over 3000 | Item | 44 | 80 |
| | | 27.0; 34.7; 52.7 | | |
| 10 | over 3000 | Item | 48 | 80 |
| | | 27.0; 35.3; 53.3 | | |
| 11 | over 3000 | Item | 46 | 60 |
| | | 27.0; 35.3; 53.3 | | |
| 12 | over 3000 | Item | 50 | 100 |
| | | 27.0; 35.3; 53.3 | | |
| 13 | over 3000 | Item | 48 | 80 |
| | | 27.0; 35.3; 53.3 | | |
| 14 | over 3000 | Item | 49 | 70 |
| | | 27.0; 35.5; 53.6 | | |
| 15 | over 1800 | Item | 45 | 60 |
| | | 27.0; 35.8; 53.8 | | |

| Properties of sorbent after heat treatment at 900° C. | | | | |
|---|---|---|---|---|
| Example No. | n | S, m²g | $\sigma_m$, kgf/cm² | XRCA data: type of lattice, main peaks at the angle 2Θ, degree |
| 1 | 15 | 16 | 17 | 18 |
| 1 | 0.05 | 32 | 180 | Rutile type 26.7; 34.3; 52.4 |
| 2 | 0.05 | 30 | 210 | Item, 26.4; 33.6; 51.8 |
| 3 | 0.05 | 35 | 180 | Item, 26.7; 34.3; 52.4 |
| 4 | 0.05 | 38 | 280 | Item, 27.0; 34.5; 52.7 |
| 5 | 0.05 | 38 | 260 | Item, 27.0; 34.3; 52.7 |
| 6 | 0.05 | 26 | 260 | Item, 27.0; 34.5; 52.7 |
| 7 | 0.05 | 30 | 175 | Item, 26.8; 34.3; 52.6 |
| 8 | 0.05 | 32 | 165 | Item, 27.0; 34.5; 52.7 |
| 9 | 0.05 | 35 | 170 | Item, 27.0; 34.7; 52.7 |
| 10 | 0.05 | 35 | 170 | Item, 27.0; 34.7; 52.7 |
| 11 | 0.05 | 30 | 150 | Item, 27.0; 35.3; 53.3 |
| 12 | 0.05 | 34 | 240 | Item, 27.0; 35.3; 53.3 |
| 13 | 0.05 | 35 | 170 | Item, 27.0; 35.3; 53.3 |
| 14 | 0.05 | 30 | 160 | Item, 27.0; 35.5; 53.6 |
| 15 | 0.05 | 30 | 145 | Item, 27.0; 35.8; 53.8 |

From Table 2 it follows that the sorbent proposed herein, based on the oxides and partially hydrated oxides of titanium, zirconium and tin, has good strength and thermochemical properties. Possessing a high strength, the sorbent, though its properties are lowered in the process of hydrothermal tests, retains its efficiency in the range of optimal composition, as regards its specific surface, hydrothermal stability (the service life being 1600 hrs and more), and chemical stability. Furthermore, from Table 2 it is seen that the sorbent with the structure of rutile type of the formula

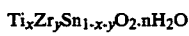

$Ti_xZr_ySn_{1-x-y}O_2 \cdot nH_2O$ where x=0.40–0.95, y=0.02–0.15, n=1.8 (Examples 1–6), possesses sorption capacity for uranium, which feature may be put to advantage in hydrometallurgy for selective recovery of this metal from sea water, natural water and process solutions. The chemical analysis of water after the whole range of autoclave tests, carried out for all samples, demonstrated that the content of titanium, tin and zirconium in the filtrate was below the detection threshold (1 μg/liter).

EXAMPLE 16

To carry out modification, a batch of 1 g of the sorbent $Ti_{0.4}Zr_{0.05}Sn_{0.55}O_2 \cdot 1.8H_2O$, prepared in accordance with Example 4 of Table 2, heat treated at 20° C., is brought in contact with 100 ml of a solution of a metal salt or base and kept under stirring for five days. In some cases for increasing the modifier content in the solid phase, the working solution is neutralized by the introduction of additives of sodium, potassium or ammonium hydroxides. On completion of keeping, the solid and liquid phases are separated, and the quantity of metal absorbed by the sorbent is calculated from the decrement in the metal concentration in the solution. An analysis of the liquid phase for the content of alkali metals, cadmium, lead, bismuth is carried out by the method of complexonometric titration; an analysis for the content of silver, manganese is carried out radiometrically, with the use of $^{54}Mn$, $^{110m}Ag$ isotopes; an analysis for the content of copper and iron is carried out by the method of acidometric titration. The sorbent is washed and dried at 100° C. The capacity for methyl iodide is determined under static conditions in an autoclave at 150° C. A 1 g batch of the sorbent is charged into an autoclave, methyl iodide vapours labelled with $^{131}I$ radionuclide are admitted thereinto, and the mixture is kept under thermostatted conditions for 24 hours. After cooling the sorbent is analyzed by the method of gamma-spectrometry for the content of methyl iodide, and the sorption capacity of the sorbent for methyl iodide ($\alpha_{CH_3I}$) is calculated.

Table 3 lists the sorption capacity characteristics of said sorbent, modified by different cations.

As is seen from the results of tests (Table 3), modification of the sorbent of the invention with the modifier content of 0.1–1.5 mole/g gives an additional increase of the sorption capacity of the sorbent with respect to organic iodine compounds from the gaseous phase.

Furthermore, Table 3 also illustrates the sorption capacity of the sorbent when cations of different metals are recovered from aqueous solutions (0.09–1.52 mole/g).

EXAMPLE 17

To carry out modification, a batch of 1 g of the sorbent $Ti_{0.70}Zr_{0.09}Sn_{0.21}O_2 \cdot 1.8H_2O$, prepared as described in Example 10 (Table 2) and heat treated at the temperature of 20° C., is contacted with 100 ml of a working solution of a metal salt or base and kept under stirring for five days. In some cases, for increasing the content of the modifier cations in the solid phase, the working solution is neutralized by introducing additives of sodium, potassium or ammonium hydroxides. On completion of keeping, the solid and liquid phases are separated, and the quantity of metal cation absorbed by the sorbent is calculated from the decrement of the metal concentration in the solution. An analysis of the liquid phase for the content of alkali metals, cadmium, lead, bismuth, yttrium, lanthanum, cerium, cobalt, nickel is carried out by the method of complexonometric titration with complexone III; for the content of zinc, chromium, silver and manganese, radiometrically, with the use of $^{65}Zn$, $^{51}Cr$, $^{110m}Ag$ and $^{54}Mn$ isotopes; for the content of copper, vanadium, antimony and iron, by the method of acidimetric titration. The sorbent is washed with water and dried at 100° C.

TABLE 3

| Example No. | Solution of modifier Composition | Absorbed cation | Concentration, mole/liter | Content of modifier in sorbent, mole/liter | $a_{CH_3I}$, mg/g |
|---|---|---|---|---|---|
| 1 | LiOH | $Li^+$ | 0.1 | 0.09 | 15 |
| 2 | $NaNO_3$ | $Na^+$ | 0.5 | 0.35 | 42 |
| 3 | KOH | $K^+$ | 0.4 | 0.29 | 55 |
| 4 | $RbNO_3$ | $Rb^+$ | 0.6 | 0.38 | 60 |
| 5 | $CsNO_3$ | $Cs^+$ | 1.2 | 0.36 | 97 |
| 6 | $Cu(NH_3)_4Cl_2$ | $Cu^{2+}$ | 0.1 | 0.17 | 31 |
| 7 | $AgNO_3$ | $Ag^+$ | 0.1 | 0.21 | 85 |
| 8 | $Cd(NO_3)_2$ | $Cd^{2+}$ | 0.5 | 0.70 | 42 |
| 9 | $Bi(NO_3)_3$ in 0.5 mole/liter $HNO_3$ | $Bi^{3+}$ | 0.1 | 0.28 | 32 |
| 10 | $Fe(NO_3)_3$ | $Fe^{3+}$ | 0.1 | 0.25 | 21 |
| 11 | $MnSO_4$ | $Mn^{2+}$ | 0.5 | 0.93 | 45 |
| 12 | $Pb(NO_3)_2$ | $Pb^{2+}$ | 0.01 | 0.1 | 20 |
| 13 | $Pb(NO_3)_2$ | $Pb^{2+}$ | 0.1 | 0.68 | 122 |
| 14 | $Pb(NO_3)_2$ | $Pb^{2+}$ | 0.5 | 1.52 | 156 |
| 15 | NaOH + CsOH | $Na^+$ + $Cs^+$ | 0.1 + 0.1 | 0.18 + 0.20 | 58 |

To determine the sorbent capacity for the $I^-$ ion in an aqueous solution, a batch of 1 g is placed into 50 ml of a 0.1 mole/liter solution of $NH_4I$ and kept for 24 hours. On completion of keeping, the sorbent is separated from the solution, washed with eater, eluted with 1 mole/liter of NaOH and analyzed by the method of back argentometric titration.

For the determination of the sorbent capacity for iodine ($a_{I_2}$) in the gaseous phase, a batch of the sorbent is placed into an autoclave, heated to the temperature of 110° C., then the autoclave is evacuated to the pressure of 0.01 mm Hg, and then the iodine vapours are discharged till complete saturation of the sorbent. The sorbent is kept in contact with the iodine vapours for 20 hours, then the iodine is evacuated to the pressure of 0.01 mm Hg. The content of iodine in the sorbent is determined as described above.

The data on the sorption capacity of said sorbent, modified with ions of different elements, are presented in Table 4.

Table 4 demonstrates that the sorbent of the proposed composition after modification effectively remove iodine from aqueous and gaseous media. Besides, the data on modifier concentration in the sorbent show marked sorption capacity of the sorbent in relation to a number of toxic elements (lead, bismuth, antimony, cadmium, barium) in aqueous and organic media: 0.56–1.52 mole/g.

EXAMPLE 18

The activity of work of the granulated sorbent as a catalyst was assessed in a gaseous mixture, having a composition (vol. %):
0.28—CO
0.15—$O_2$
the balance being argon.
To do that, a modified sample of the sorbent

$Ti_{0.4}Zr_{0.15}Sn_{0.45}O_2 \cdot 0.26H_2O$ (Table 2, Example 5), heat-treated at the temperature of 400° C., is charged into a thermostatted column, having an inner diameter of 14 mm. The height of the charge is 40 mm. The surface of said sorbent is modified as in Example 16. After modification, the samples of the sorbent are subjected to heat treatment at the temperatures of 100°, 400°, 900° C.

TABLE 4

| Example No. | Solution of modifier Composition | Absorbed cation | Concentration, mole/liter | Content of modifier in sorbent, mmole/g | $a_{I_2}$ mg-equiv./g Water | $a_{I_2}$ mg-equiv./g Gas |
|---|---|---|---|---|---|---|
| 1 | $MgCl_2$ | $Mg^{2+}$ | 0.1 | 0.6 | — | 0.16 |
| 2 | $Ca(OH)_2$ | $Ca^{2+}$ | 0.03 | 0.82 | — | 0.24 |
| 3 | $SrCl_2$ | $Sr^{2+}$ | 0.1 | 0.9 | — | 0.26 |
| 4 | $Ba(OH)_2$ | $Ba^{2+}$ | 0.1 | 1.12 | — | 0.38 |
| 5 | $Cu(NH_3)_2Cl_2$ | $Cu^{2+}$ | 0.1 | 0.42 | — | 0.32 |
| 6 | $AgNO_3$ | $Ag^+$ | 0.01 | 0.51 | — | 0.46 |
| 7 | $CdSO_4$ | $Cd^{2+}$ | 0.5 | 1.5 | 0.31 | — |
| 8 | $SbCl_3$ in acetone | $Sb^{3+}$ | 0.05 | 0.56 | 0.28 | — |
| 9 | $Pb(NO_3)_2$ | $Pb^{2+}$ | 0.01 | 0.09 | 0.05 | 0.75 |
| 10 | $Pb(NO_3)_2$ | $Pb^{2+}$ | 0.1 | 0.81 | 0.35 | 0.35 |
| 11 | $Pb(NO_3)_2$ | $Pb^{2+}$ | 0.5 | 1.52 | 0.5 | 0.32 |
| 12 | $Bi(NO_3)_3$ in 0.5 mole/liter $HNO_3$ | $Bi^{3+}$ | 0.1 | 0.9 | 0.45 | 0.27 |
| 13 | $Y(NO_3)_3$ | $Y^{3+}$ | 0.1 | 0.38 | — | 0.22 |
| 14 | $La(NO_3)_3$ | $La^{3+}$ | 0.1 | 0.35 | — | 0.26 |
| 15 | $Mg(NO_3)_2$ + $Ca(NO_3)_2$ | $Mg^{2+}$ + $Ca^{2+}$ | 0.1 + 0.1 | 0.36 + 0.42 | — | 0.32 |

At the temperature pf 500° C. the initial gas is passed through the sorbent, while monitoring the concentration of carbon monoxide after the column and the degree of carbon monoxide conversion into carbon dioxide. The content of carbon monoxide and carbon dioxide in the gas is determined chromatographically.

The data on the catalytic activity of said sorbent modified with noble metals are presented in Table hereinbelow.

TABLE 5

| | Modifier solution Composition | Metal absorbed | Concentration, μmole/liter | Content of modifier in sorbent, μmole/g | Degree of CO $CO_2$ conversion during heat treatment, % 100° C. | 400° C. | 900° C. |
|---|---|---|---|---|---|---|---|
| 1. | $K_2[PdCl_4]$ in 0.1 mole/liter HCl | Pd | 35 | 3.1 | 98.8 | 98.8 | 82.4 |
| 2. | $K_2[Ru(OH)_2Cl_4]$ in 0.2 mole/liter HCl | Ru | 80 | 5.3 | 99.1 | 99.0 | 92.7 |
| 3. | $Na_3[RhCl_6]$ in 0.11 mole/liter HCl | Rh | 25 | 2.0 | 99.1 | 99.2 | 92.5 |
| 4. | $K_2[PtCl_6]$ in 0.01 mole/liter HCl | Pt | 6.0 | 0.5 | 98.4 | 98.2 | 91.8 |

TABLE 5-continued

| Modifier solution | | | Content of modifier in sorbent, μmole/g | Degree of CO CO₂ conversion during heat treatment, % | | |
|---|---|---|---|---|---|---|
| Composition | Metal absorbed | Concentration, μmole/liter | | 100° C. | 400° C. | 900° C. |
| 5. K₂[PtCl₆] in 0.01 mole/ liter HCl | Pt | 120 | 9.8 | 99.4 | 99.5 | 91.9 |
| 6. K₂[PtCl₆] in 0.01 mole/ liter HCl | Pt | 1200 | 102 | 99.9 | 99.9 | 92.0 |

The results of tests demonstrate that the sorbent having the herein-proposed composition, modified with noble metals in an amount of 0.0005–0.1 mmole/g, may be used with a high efficiency as a heterogeneous catalyst in the oxidation of carbon monoxide on high-temperature gas streams.

EXAMPLE 19

The activity of work of the granulated sorbent as a catalyst was assessed in a gaseous mixture, having a composition (vol. %):

0.28—CO
0.15—$O_2$ the balance being argon.

To do that, a modified sample of the sorbent having the formula $Ti_{0.5}Zr_{0.09}Sn_{0.41}O_2 \cdot 0.25H_2O$ (Table 2, Example 9), heat-treated at the temperature of 400° C., is charged into a thermostatted column having an inner diameter of 0.14 mm. The charge height is 40 mm. The sorbent surface is modified as described in Example 17. After modification the sorbent samples are subjected to heat treatment at the temperatures of 100°, 400°, 900° C.

At the temperature of 500° C. the initial gas is passed through the sorbent, while monitoring the concentration of carbon monoxide after the column and calculating the degree of conversion of carbon monoxide into carbon dioxide. The content of carbon monoxide and carbon dioxide in the gas is determined chromatographically. The data on the composition of the modified sorbent and on its catalytic activity are presented in Table 6 hereinbelow.

EXAMPLE 20

To establish optimal pH range of the gelling liquid, a sol prepared in accordance with Examples 4, 8 of Table 1, is dispersed dropwise into a dilute solution of ammonia with pH 12. The granules are washed with water to neutral reaction and dried in air at 20° C. The resulting product is a granulated sorbent with the grain size of 2.5–3 mm. In a similar manner the sorbent at other pH values of the ammonia solution is prepared; said solution may also be replaced by an alkali. The physicochemical characteristics of the samples of said sorbents (S, $\sigma_m$), depending on the pH of the gelling liquid, are presented in Table 7 hereinbelow.

TABLE 6

| Modifier solution | | Concentration, mole/liter | Content of modifier in sorbent, mole/g | Degree of CO→CO₂ conversion during heat treatment, % | | |
|---|---|---|---|---|---|---|
| Composition | Ion absorbed | | | 100° C. | 400° C. | 900° C. |
| 1. VO(NO₃)₂ | $VO^{2+}$ | 0.2 | 0.22 | 99.9 | 99.9 | 93.4 |
| 2. CrCl₃ | $Cr^{3+}$ | 0.2 | 0.4 | 97.9 | 97.9 | 91.2 |
| 3. MnCl₂ | $Mn^{2+}$ | 0.3 | 0.91 | 99.9 | 99.9 | 91.6 |
| 4. FeCl₃ | $Fe^{3+}$ | 0.1 | 0.25 | 98.4 | 98.3 | 88.8 |
| 5. CoCl₂ | $Co^{2+}$ | 0.2 | 0.37 | 98.2 | 98.4 | 90 |
| 6. NiCl₂ | $Ni^{2+}$ | 0.2 | 0.3 | 98.8 | 98.9 | 90.6 |
| 7. Ce(NO₃)₃ | $Ce^{3+}$ | 0.1 | 0.27 | 98.5 | 99.1 | 92.6 |
| 8. Cu(NH₃)₄Cl₂ | $Cu^{2+}$ | 0.005 | 0.09 | 98.6 | 99.2 | 89.2 |
| 9. Cu(NH₃)₄Cl₂ | $Cu^{2+}$ | 0.05 | 0.62 | 99.1 | 99.5 | 89.6 |
| 10. Cu(NH₃)₄Cl₂ | $Cu^{2+}$ | 0.25 | 1.52 | 99.4 | 99.7 | 89.7 |

TABLE 7

| Example No. in Table 1 | Mole ratio of metal chlorides in sol | | | Character-istics | Gelling liquid NH₄OH | | |
|---|---|---|---|---|---|---|---|
| | Ti | Zr | Sn | | pH 11.0 | pH 11.4 | pH 12.0 |
| 1 | 2 | 3 | 4 | 5 | 6 | 7 | 8 |
| 4 | 0.4 | 0.05 | 0.55 | S, m²/g $\sigma_m$, kgf/cm² | — | 220 Deformation of granules | 226 50 |
| 8 | 0.4 | 0.15 | 0.45 | S, m²/g $\sigma_m$, kgf/cm² | — | 230 Deformation of granules | 224 50 |

| Example No. in Table 1 | Gelling liquid | | | |
|---|---|---|---|---|
| | NH₄OH pH 14 | concentrated | NaOH pH 14.0 | KOH pH 14.0 |
| 1 | 9 | 10 | 11 | 12 |
| 4 | 222 65 | 220 80 | 205 50 | 207 50 |
| 8 | 212 60 | 208 75 | 207 55 | 203 55 |

From the data presented in Table 7 it is seen that, as concerns the strength of the sorbent material, gelling medium with the pH value ≧ 12 proves to be optimal. At smaller pH the granules are either deformed or destroyed.

EXAMPLE 21

An aqueous solution containing 0.4 mole/liter of titanium chloride and 0.6 mole/liter of tin chloride with a total concentration of 1 mole/liter (mole ratio Ti:Sn= 0.4:0.6) is fed to the middle chamber of a three-chamber electrolytic cell, separated by corresponding membranes from the cathode and anode thereof. The cathode and anode chambers are filled initially with a 0.1 mole/liter solution of hydrochloric acid. As the electrodes use is made of materials, resistant to hydrochloric acid and chlorine: graphite for the anode and titanium for the cathode. Electrolysis is carried out at the temperature of 40° C. and membrane current density, of 400 A/m² till the atomic chlorine-to-metal ratio becomes 0.3.

The prepared sol is dispersed dropwise through a glass capillary having an inner diameter of 0.25 mm into a gelling liquid, the latter being an aqueous solution of ammonia with pH 12. The gel globules are washed with distilled water to remove the electrolyte and then are heat-treated: one lot at 20° C., a second lot at 400° C., and a third lot at 900° C. The resulting granules of the sorbent have a shape close to the spherical one. At 20° C. the size of the sorbent granules is 0.5-0.8 mm.

The resulting sorbent has the formula $$Ti_{0.4}Sn_{0.6}O_2 \cdot nH_2O$$

where n=1.8, 0.26, 0.05, respectively, at the heat-treatment temperatures of 20°, 400°, 900° C.

The conditions of the electrochemical stage of producing the sorbent of the formula $$Ti_xSn_{1-x}O_2 \cdot nH_2O$$

in accordance with Examples 22-23, realized as in Example 20, are presented in Table 8 hereinbelow.

TABLE 8

| Example No. 1 | Aqueous solution of chlorides Total concentration of metal, mole/liter | Molar ratio of metal chlorides Ti | Molar ratio of metal chlorides Sn | Electrolysis temperature, °C. | Chlorine-to-metal atomic ratio | XRCA data (type of lattice) |
|---|---|---|---|---|---|---|
| 22 | 1.0 | 0.05 | 0.95 | 10 | 1.0 | Rutile type |
| 23 | 1.0 | 0.90 | 0.10 | 80 | 0.2 | Item |

The XRCA data and the properties of the sorbents prepared in accordance with Examples 21-23 are presented in Table 9 hereinbelow.

TABLE 9

| | Properties of sorbent, obtained after heat-treatment at 20° C. | | | | |
|---|---|---|---|---|---|
| Example No. 1 | Composition of sorbent 2 | n 3 | S, m²/g 4 | $\sigma_m$, kgf/cm² 5 | XRCA data: type of lattice, main peaks at the angle of 2Θ, degree 6 |
| 21 | $Ti_{0.4}Sn_{0.95}O_2 \cdot nH_2O$ 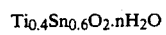 | 1.8 | 230 | 135 | Rutile type 27.0; 34.5; 52.9 |
| 22 | $Ti_{0.05}Sn_{0.6}O_2 \cdot nH_2O$ | 1.8 | 210 | 130 | Item, 26.4; 33.6; 51.8 |
| 23 | $Ti_{0.90}Sn_{0.10}O_2 \cdot nH_2O$ 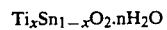 | 1.8 | 250 | 130 | Item, 27.1; 34.9; 52.9 |

Properties of sorbent, obtained after heat treatment at

TABLE 9-continued

| | 125° C. | | | | 400° C. After hydrothermal treatment | | |
|---|---|---|---|---|---|---|---|
| Example No. 1 | $a_u$, µmole/g 7 | n 8 | S, m²g 9 | $\sigma_m$, kgf/cm² 10 | Hydrothermal stability hr 11 | XRCA data 12 | S, m²g 13 | $\sigma_m$, kgf/cm² 14 |
| 21 | 5.7 | 0.26 | 111 | 320 | 3000 | Rutile type, 27.0; 34.5; 52.9 | 95 | 130 |
| 22 | 0.8 | 0.28 | 100 | 460 | 3000 | Item, 26.4; 33.6; 51.8 | 80 | 130 |
| 23 | 12.8 | 0.26 | 115 | 300 | 3000 | Item, 27.1; 34.9; 52.9 | 90 | 120 |

| | Properties of sorbent, obtained after heat-treatment at 900° C. | | | |
|---|---|---|---|---|
| Example No. 1 | n 15 | S, m²/g 16 | $\sigma_m$, kgf/cm² 17 | XRCA data 18 |
| 21 | 0.05 | 33 | 470 | Rutile type 27.0; 34.5; 52.9 |
| 22 | 0.05 | 30 | 500 | Item, 26.4; 33.6; 51.8 |
| 23 | 0.05 | 25 | 410 | Item, 27.1; 34.9; 52.9 |

According to the data presented in Table 9, all the sorbents of the formula $Ti_xSn_{x-1}O_2 \cdot nH_2O$ where x=0.05-0.90, n=0.05-1.8, have a crystalline structure with a lattice of rutile type, feature a developed surface (S=30-250 m²/g) and high strength characteristics ($\sigma_m$=135-500 kgf/cm²). The sorbents, obtained after heat-treatment at 400° C., have a service life longer than 3000 hrs under hydrothermal test conditions. The useful properties of the sorbents, obtained after heat treatment at 125° C., are confirmed by the fact that they possess sorption capacity for uranium ($a_u$=0.8-12.8 µmole/g).

EXAMPLE 24

To carry out modification, a batch of 1 g of the sorbent $Ti_{0.4}Sn_{0.6}O_2 \cdot 1.8H_2O$, prepared as in Example 21 (Table 9) and heat-treated at 20° C., is brought in contact with 100 ml of a solution of a metal salt or of a mixture thereof, and kept under stirring for five days. On completion of keeping, the solid and liquid phases are separated and the quantity of metal absorbed by the sorbent is calculated from the decrement of its concentration in the solution. The liquid phase is analyzed for the content of lead, cobalt and liquid by the method of complexometric titration, using complexone III; for the content of zinc, radiometrically, using $^{65}Zn$ isotope; for the content of copper, vanadium, antimony and iron, by the method of acidimetric titration. The sorbent is washed with water and heat treated at 100° C.

The sorption capacity ($a_{CH_3I}$) of said sorbent, depending on the composition and concentration of the modifier, is presented in Table 10 hereinbelow.

TABLE 10

| Aqueous solution of modifier | | | Content of modifier in sorbent, mole/g | Content of $CH_3I$ in gaseous phase, under static conditions at 110° C., mg/g |
|---|---|---|---|---|
| Composition | Cation absorbed | Concentration, mole/g | | |
| 1. $Fe(NO_3)_2$ | $Fe^{2+}$ | 0.5 | 1.2 | 20 |
| 2. $CoCl_2$ | $Co^{2+}$ | 0.3 | 0.7 | 25 |
| 3. $NiCl_2$ | $Ni^{2+}$ | 0.3 | 0.7 | 25 |
| 4. $Cu(NH_3)_4Cl_2$ | $Cu^{2+}$ | 1.0 | 1.4 | 35 |
| 5. $ZnCl_3$ | $Zn^{2+}$ | 0.5 | 0.8 | 30 |
| 6. $Pb(NO_3)_2$ | $Pb^{2+}$ | 0.5 | 1.5 | 70 |
| 7. $Pb(NO_3)_2$ | $Pb^{2+}$ | 0.01 | 0.1 | 10 |
| 8. $Pb(NO_3)_2$ | $Pb^{2+}$ | 0.2 | 0.9 | 50 |
| 9. $Fe(NO_3)_2 + CoCl_2 +$ $NiCl_2 +$ $Cu(NH_3)_4Cl_2 +$ $ZnCl_2 +$ $Pb(NO_3)_2$ | $Fe^{2+} + Co^{2+} +$ $Ni^{2+} +$ $Cu^{2+} +$ $Zn^{2+} +$ $Pb^{2+}$ | 1.6 | 1.5 | 45 |

EXAMPLE 25

The catalytic activity of the sorbent of the formula $$Ti_{0.4}Sn_{0.6}O_2 \cdot 0.26H_2O,$$

modified under the conditions of Example 24, is assessed at the temperature of 500° C. in a gaseous mixture, having the following composition (vol. %): 0.28 CO, 0.15 $O_2$, the balance being argon.

The catalytic activity characteristics of the modified sorbent are determined as in Example 19.

The data on the catalytic activity (the degree of $CO \rightarrow CO_2$ conversion) of the sorbent, depending on the composition and concentration of the modifier, are presented in Table 11 hereinbelow.

TABLE 11

| Modifier solution | | | Content of modifier in sorbent, mole/g | Degree of $CO \rightarrow CO_2$ conversion, % |
|---|---|---|---|---|
| Composition | Ion absorbed | Concentration, mole/liter | | |
| 1. $SbCl_3$ in acetone | $Sb^{3+}$ | 0.2 | 0.64 | 99.1 |
| 2. $VO(NO_3)_2$ | $VO^{2+}$ | 0.7 | 0.83 | >99.9 |
| 3. $Na_3PO_4$ | $P^{5+}$ | 1.0 | 1.5 | 99.7 |
| 4. $SbCl_3$ in acetone | $Sb^{3+}$ | 0.05 | 0.09 | 98.0 |
| 5. $SbCl_3$ in acetone | $Sb^{3+}$ | 0.5 | 1.5 | 99.5 |
| 6. $SbCl_3$ in acetone + $VO(NO_3)_2 +$ $Na_3PO_4$ | $Sb^{3+} +$ $V^{2+} +$ $P^{5+}$ | Σ1.4 | Σ1.5 | 99.8 |

EXAMPLE 26

An aqueous solution containing 0.04 mole/liter of zirconium chloride and 0.76 mole/liter of tin chloride, with the total concentration of 0.8 mole/liter (the molar ratio Zr:Sn=0.05:0.95), is fed to the middle chamber of a three-chamber electrolytic cell, separated from the cathode and anode thereof by corresponding ion-exchange membranes. The cathode chamber and the anode chamber are filled with a 0.1 mole/liter solution of hydrochloric acid. The anode is made of graphite and the cathode is made of titanium. The electrolysis is carried out at the membrane current density of 300 A/m² and the temperature of 38° C., till the chlorine-to-metal atomic ratio becomes 0.65.

The sol obtained by the electrosynthesis is dispersed dropwise into a gelling liquid, the latter being an aqueous solution of ammonia with pH 12. The gel particles are washed from the electrolytes with distilled water, a first lot is then heat-treated at 20° C.; a second lot, at 400° C., and a third lot, at 900° C.

The resulting granules of the sorbent have a shape close to the spherical one. At 20° C. the size of the sorbent granules is 0.1–0.5 mm.

The sorbent thus prepared has the formula $$Zr_{0.05}Sn_{0.95}O_2 \cdot nH_2O,$$

where n=1.8, 0.27, 0.05 at the temperatures of 20°, 400°, 900° C., respectively.

The conditions of the electrochemical stage of producing the sorbent of the formula $Zr_ySn_{1-y}O_2 \cdot nH_2O$, according to Examples 27–29, realized as described in Example 26, are presented in Table 12 hereinbelow.

The XRCA data and the properties of the sorbents, obtained in accordance with Examples 26–29, are presented in Table 13 hereinbelow.

TABLE 12

| Example No. | Aqueous solution of chlorides | | | Electrolysis temperature, °C. | Chlorine-to-metal atomic ratio | XRCA data (type of lattice) |
|---|---|---|---|---|---|---|
| | Total concentration of metal, mole/liter | Molar ratio of metal chlorides | | | | |
| | | Zr | Sn | | | |
| 27 | 0.3 | 0.02 | 0.98 | 10 | 0.65 | Rutile type |
| 28 | 3.0 | 0.10 | 0.90 | 50 | 0.58 | Item |
| 29 | 1.5 | 0.15 | 0.85 | 80 | 0.50 | Item |

TABLE 13

| | | | | | Properties of sorbent, obtained after heat-treatment at 20° C. | |
|---|---|---|---|---|---|---|
| Example No. | Composition of sorbent | n | S, m²/g | $\sigma_m$, kgf/cm² | XRCA data: type of lattice, main peaks at the angle of 2Θ, degree | |
| 1 | 2 | 3 | 4 | 5 | 6 | |
| 26 | $Zr_{0.05}Sn_{0.95}O_2 \cdot nH_2O$ | 1.8 | 245 | 130 | Rutile type 26.2; 33.1; 51.4 | |
| 27 | $Zr_{0.02}Sn_{0.98}O_2 \cdot nH_2O$ | 1.8 | 250 | 120 | Item, 26.2; 33.1; 51.4 | |
| 28 | $Zr_{0.10}Sn_{0.90}O_2 \cdot nH_2O$ | 1.8 | 248 | 130 | Item, 26.2; 33.1; 51.4 | |
| 29 | $Zr_{0.15}Sn_{0.85}O_2 \cdot nH_2O$ | 1.8 | 250 | 135 | Item, 26.2; 33.1; 51.4 | |

Properties of sorbent, obtained after heat treatment at the temperature of 400° C.

TABLE 13-continued

| Example No. 1 | n 7 | S, m²/g 8 | $\sigma_m$, kgf/cm² 9 | After hydrothermal treatment | | S, m²/g 12 | $\sigma_m$, kgf/cm² 13 |
|---|---|---|---|---|---|---|---|
| | | | | Hydrothermal stability, hr 10 | XRCA data 11 | | |
| 26 | 0.27 | 78 | 300 | over 3000 | Rutile type, 26.2; 33.1; 51.4 | 43 | 115 |
| 27 | 0.25 | 47 | 290 | over 3000 | Item, 26.2; 33.1; 51.4 | 43 | 118 |
| 28 | 0.28 | 90 | 290 | over 3000 | Item, 26.2; 33.1; 51.4 | 45 | 120 |
| 29 | 0.29 | 92 | 300 | over 3000 | Item, 26.2; 33.1; 51.4 | 45 | 120 |

| Example No. 1 | n 14 | Properties of sorbent, obtained after heat-treatment at 900° C. | | |
|---|---|---|---|---|
| | | S, m²/g 15 | $\sigma_m$, kgf/cm² 16 | XRCA data 17 |
| 26 | 0.05 | 31 | 210 | Rutile type 26.2; 33.1; 51.4 |
| 27 | 0.05 | 30 | 205 | Item, 26.2; 33.1; 51.4 |
| 28 | 0.05 | 32 | 210 | Item, 26.2; 33.1; 51.4 |
| 29 | 0.05 | 30 | 220 | Item, 26.2; 33.1; 51.4 |

EXAMPLE 30

To carry out modification, a batch of 1 g of the sorbent $Zr_{0.05}Sn_{0.95}O_2.0.27H_2O$, prepared as described in Example 26 (Table 13) and heat-treated at the temperature of 400° C., is brought in contact with 100 ml of a working solution of a salt, and kept under stirring for five days. In some cases, for increasing the modifier content in the solid phase, the working solution is neutralized by introducing additions of sodium, potassium or ammonium hydroxides. On completion of keeping, the solid and liquid phases are separated and the quantity of metal absorbed by the sorbent is calculated from the decrement of the metal concentration in the solution. The liquid phase is analyzed for the content of cobalt, nickel by the method of complexonometric titration with complexone III; for the content of zinc and manganese, radiometrically with the use of $^{65}Zn$ and $^{54}Mn$ isotopes; for the content of copper and iron, by the method of acidimetric titration. The sorbent is washed with water and subjected to heat treatment at 100°, 400° and 900° C.

In Table 14 data are presented on the sorption capacity for iodine ($a_{I_2}$) of the modified sorbent, depending on the composition and concentration of the modifier.

EXAMPLE 31

The catalytic activity of the sorbent of the formula $Zr_{0.05}Sn_{0.95}O_2.0.27H_2O$, modified under the conditions of Example 30, is assessed at the temperature of 500° C. on a gaseous mixture, having the following composition (vol. %): 0.28 CO, 0.15 $O_2$, the balance being argon. The catalytic activity characteristics of the modified sorbent are determined as in Example 19.

TABLE 14

| | Aqueous Solution of modifier | | | Content of modifier in sorbent, mole/g | $a_{I_2}$, mg-equiv./g of modified sorbent after heat treatment at | | |
|---|---|---|---|---|---|---|---|
| | Composition | Cation absorbed | Concentration, mole/liter | | 100° C. | 400° C. | 900° C. |
| 1. | $MnCl_2$ | $Mn^{2+}$ | 0.5 | 0.92 | 0.95 | 0.89 | 0.16 |
| 2. | $Fe(NO_3)_2$ | $Fe^{2+}$ | 0.5 | 0.37 | 0.45 | 0.43 | 0.10 |
| 3. | $CoCl_2$ | $Co^{2+}$ | 0.3 | 0.32 | 0.76 | 0.72 | 0.12 |
| 4. | $NiCl_2$ | $Ni^{2+}$ | 0.3 | 0.13 | 0.48 | 0.45 | 0.09 |
| 5. | $ZnCl_2$ | $Zn^{2+}$ | 0.5 | 0.48 | 0.52 | 0.48 | 0.08 |
| 6. | $Cu(NH_3)_4Cl_2$ | $Cu^{2+}$ | 0.5 | 1.50 | 1.41 | 1.32 | 0.26 |
| 7. | $Cu(NH_3)_4Cl_2$ | $Cu^{2+}$ | 0.01 | 0.1 | 0.40 | 0.38 | 0.08 |
| 8. | $Cu(NH_3)_4Cl_2$ | $Cu^{2+}$ | 0.1 | 0.48 | 1.06 | 0.96 | 0.16 |
| 9. | $Mn(NO_3)_2 + Co(NO_3)_2$ | $Mn^{2+} + Co^{2+}$ | 0.4 + 0.4 | $\Sigma 0.75$ | 0.87 | 0.82 | 0.18 |

TABLE 15

| Example No. | Aqueous solution of modifier | | | Content of modifier in sorbent, μmole/g | Degree of CO→$CO_2$ conversion, % |
|---|---|---|---|---|---|
| | Composition | Metal absorbed | Concentration, μmole/liter | | |
| 17 | $K_2[PdCl_4]$ in 0.1 mole/liter HCl | Pd | 45 | 4.2 | 99.0 |
| 18 | $K_2[PtCl_4]$ in | Pt | 7.5 | 0.5 | 99.3 |
| 19 | $K_2[PtCl_4]$ in | Pt | 145.0 | 12.0 | 99.6 |
| 20 | $K_2[PtCl_4]$ in | Pt | 1200 | 100.0 | 99.9 |

In Table 15 data are presented on the catalytic activity of the sorbent (degree of CO→$CO_2$ conversion), depending on the composition and content of the modifier.

INDUSTRIAL APPLICABILITY

The herein-proposed granulated inorganic sorbent, due to its high sorption and catalytic activity, high strength of the granules, developed porous structure which is stable in time, the presence of different modifiers on the surface thereof, whenever necessary, will provide an increase in the efficiency of different high-temperature technological processes. The sorbent of the invention possesses a high hydrothermal stability. This will make it applicable for the purification of the non-cooled aqueous heat-transfer agent of atomic power plants from the products of corrosion and radionuclides, whereby the useful time of the reactor will be increased, thermal losses will be reduced, deposits in the loop will be diminished, the radiation situation in the serviced premises will be improved; as a result, the consumption of doses will be cut down, i.e. the economical efficiency and reliability of the atomic power plants will be increased.

The sorbents proposed herein may be used with a high efficiency for the purification of the gaseous heat transfer agent, gaseous discharges of the nuclear reactor from different radionuclides, including iodine and iodine derivatives, and also in catalytic high-temperature processes for the utilization of harmful gaseous discharges, which gives an appreciable economic effect.

Said properties will make the sorbent applicable in the atomic power engineering, in the chemical industry, in heterogeneous catalysis.

We claim:

1. A granulated inorganic sorbent on the basis of oxides of metals belonging to group IV of the Periodic System, characterized in that it has the following formula $$Ti_xZr_ySn_{1-x-y}O_2 \cdot nH_2O$$

where $0 < x+y < 1$, $x = 0$–$0.95$, $y = 0$–$0.15$, $n = 0.05$–$1.8$, a specific surface of 30 to 250 m$^2$/g and is a solid solution with a rutile structure, and with diffractogram, as measured using $Cu$-$K\alpha$-radiation, characterized by principal peaks at the angle $2\theta$ equal to $26.8 \pm 0.7$, $34.5 \pm 1.5$, $52.8 \pm 1.5$ degrees.

2. A granulated inorganic sorbent according to claim 1, characterized in that it has the following formula $$Ti_xZr_ySn_{1-x-y}O_2 \cdot nH_2O$$

where $x = 0.05$–$0.40$, $y = 0.02$–$0.15$, $n = 0.05$–$1.8$, and has a structure corresponding to a diffractogram, characterized by principal peaks at the angle $2\theta$ equal to $26.8 \pm 0.4$, $34.0 \pm 0.9$, $52.2 \pm 0.8$ degrees.

3. A granulated inorganic sorbent according to claim 1, characterized in that it has the following formula $$Ti_xZr_ySn_{1-x-y}O_2 \cdot nH_2O$$

where $x = 0.40$–$0.95$, $y = 0.02$–$0.15$, $n = 0.05$–$1.8$, possessing a structure with an X-ray diffractogram characterized by principal peaks at the angle $2\theta$ equal to $26.8 \pm 0.4$, $35.2 \pm 0.9$, $53.5 \pm 0.8$ degrees.

4. A granulated inorganic sorbent according to claim 1, characterized in that it has the following formula $$Ti_xSn_{1-x}O_2 \cdot nH_2O$$

where $x = 0.05$–$0.90$, $n = 0.05$–$1.8$, possessing a structure with a diffractogram characterized by principal peaks at the angle $2\theta$ equal to $26.8 \pm 0.7$, $34.5 \pm 1.5$, $52.8 \pm 1.5$ degrees.

5. A granulated inorganic sorbent according to claim 1, characterized in that it has the following formula:

$$Zr_ySn_{1-y}O_2 \cdot nH_2O$$

where $y = 0.02$–$0.15$, $n = 0.05$–$1.8$, possessing a structure with an X-ray diffractogram characterized by principal peaks at the angle $2\theta$ equal to $26.2 \pm 0.05$, $33.1 \pm 0.05$, $51.4 \pm 0.05$ degrees.

6. A granulated inorganic sorbent according to claim 1, characterized in that its surface has been modified by treatment with at least one element selected from one of groups I, II, III, V, VI, VII, VIII of the Periodic System, the amount of the said element being within 0.0005 to 1.5 mole/g of the said sorbent.

7. A granulated inorganic sorbent according to claim 1, characterized in that its granules have a spherical shape and a size of 0.001 to 3 mm, limit of fracture being at least 50 kgf/cm$^2$.

8. A method of producing a granulated inorganic sorbent according to claim 1 on the basis of oxides of metals belonging to group IV of the Periodic System, characterized in that an aqueous solution containing tin chloride and at least one chloride of a metal selected from the group of titanium and zirconium at a molar ratio Ti:Zr:Sn = (0–0.95):(0–0.15):(0.03–1.0) is subjected to electrolysis until the atomic ratio of chlorine to the metal becomes equal to 0.2–1.0, ensuring the formation of a mixed sol of the hydrated oxides of metals, followed by dropwise dispersing of said sol in a gelating liquid with pH $\geq$ 12, separating of the formed gel particles, which are then washed and subjected to heat treatment at a temperature within 20° to 900° C. yielding granules of the desired product having the following formula:

$$Ti_xZr_ySn_{1-x-y}O_2 \cdot nH_2O$$

where $0 < x+y < 1$, $x = 0$–$0.95$, $y = 0$–$0.15$, $n = 0.05$–$1.8$, having a specific surface of 30–250 m$^2$/g and representing a solid solution with a rutile type structure, and with X-ray diffractogram, as measured using $Cu$-$K\alpha$-radiation, characterized by principal peaks at the angle $2\theta$ equal to $26.8 \pm 0.7$, $34.5 \pm 1.5$; $52.8 \pm 1.5$ degrees.

9. A method according to claim 8, characterized in that the aqueous solution subjected to electrolysis contains chlorides of titanium, zirconium and tin at the molar ratio Ti:Zr:Sn = (0.05–0.40):(0.02–0.15):(0.43–0.95) until the atomic ratio of chlorine to metal becomes 0.2–1.0.

10. A method according to claim 8, characterized in that the aqueous solution subjected to electrolysis contains chlorides of titanium, zirconium and tin at the molar ratio Ti:Zr:Sn = (0.40–0.95):(0.02–0.15):(0.03–0.45) until the atomic ratio of chlorine to metal becomes 0.2–1.0.

11. A method according to claim 8, characterized in that the aqueous solution subjected to electrolysis contains chlorides of titanium and tin at the molar ratio Ti:Sn = (0.05–0.90):1 until the atomic ratio of chlorine to metal becomes 0.2–1.0.

12. A method according to claim 8, characterized in that the aqueous solution subjected to electrolysis contains chlorides of titanium and tin at the molar ratio Ti:Sn = (0.02–0.15):(0.85–0.98) until the atomic ratio of chlorine to metal becomes 0.50–1.0.

13. A method according to claim 8, characterized in that an aqueous solution of ammonia or an alkali is used as the gelling liquid.

14. A method according to claim 8, wherein said sorbent produced by said heat treatment, is further treated, in order to modify its surface, with a $6 \times 10^{-6}$–$1.5$ mole/liter solution of at least one salt of an element selected from groups I, II, III, V, VI, VII, VIII of the Periodic System, or a hydroxide of at least one metal selected from gruop I or II of the Periodic System and is further subjected to heat treatment at a temperature within 100° to 900° C.

15. A method according to claim 8, characterized in that the total concentration of chlorides of said metals in the aqueous solution subjected to electrolysis is within 0.3 to 3 mole/liter.

16. A method according to claim 8, characterized in that the electrolysis is conducted at a temperature within 10° to 80° C.

17. A process according to claim 8 wherein said heat-treatment is carried out at a temperature between 400° and 900° C.

* * * * *